Jan. 30, 1951 P. W. CARR ET AL 2,539,891
BELT
Filed Aug. 12, 1947
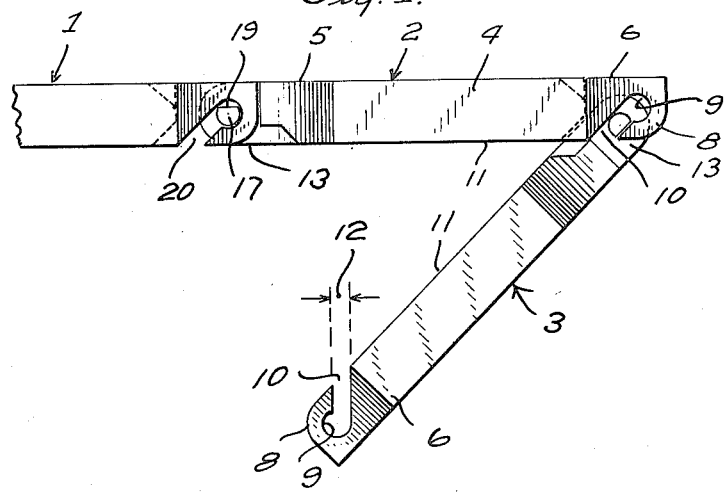
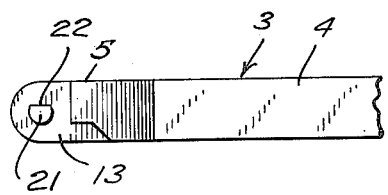
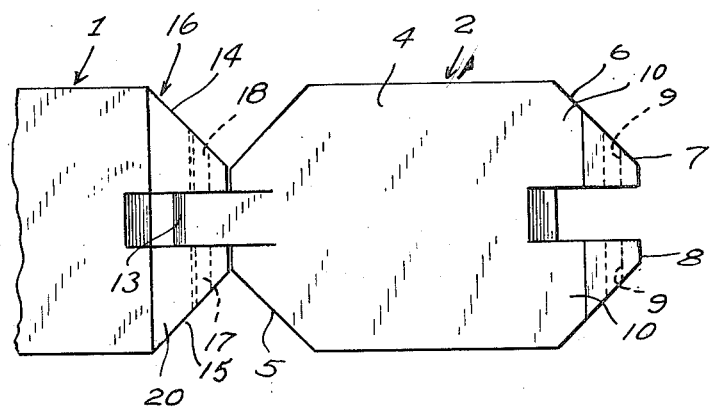
INVENTORS
PERCY W. CARR
STEPHEN G. GERLACH
BY
George T. Gill
ATTORNEY Patented Jan. 30, 1951

2,539,891

UNITED STATES PATENT OFFICE 2,539,891

BELT

Percy W. Carr, Maplewood, N. J., and Stephen G. Gerlach, Jersey City, N. J.; said Gerlach assignor to said Carr Application August 12, 1947, Serial No. 771,532

2 Claims. (Cl. 2—339)

The invention herein disclosed relates to a belt for wearing apparel. More particularly, the invention relates to a flexible belt of the kind mentioned that is made up of a series of like links flexibly joined together.

An object of this invention is to provide a belt link which is readily assembled with like links to form a flexible belt for wearing apparel. Another object of the invention is to provide a belt link that is readily and easily interchanged with any link in a flexible belt made up of such links. A further object of the invention is to provide interchangeable links for a flexible belt that are comparatively inexpensive to manufacture.

The foregoing objects and certain advantages that will hereinafter appear are realized in the embodiment of the invention illustrated in the accompanying drawing and described in detail below, from which description a clear understanding of the invention may be had.

The drawing includes:

Fig. 1 which is a side elevation of two links joined together in end to end relation;

Fig. 2 which is a fragmentary side elevation of a like link; and

Fig. 3 which is a rear elevation of two links joined together in end to end relation.

In general, a belt that embodies this invention includes a series of links, alike in construction, such as the link 1, 2 and 3, and flexibly united in end to end relation. The end links of such a belt may be joined, in like manner as the links, to a suitable buckle or clasp as may be desired. The links are readily and easily assembled into a belt, or removed and replaced, by the ordinary individual, to form a belt or to change the decorative effect or appearance of the belt.

Each link, such as the link 2, desirably consists of a complete unit and may be molded as a single piece from any of the well known thermo-plastic resins. Primarily, a link includes a central portion 4 and two end portions 5 and 6 at opposite ends of the central portion. The central portion may be plain or decorated in any desired manner, and, as will be obvious, links of various colors may be provided. The end portions have converging side edges, but may of course take other shapes or forms.

The end portion 6 is bifurcated to provide spaced arms 7 and 8. In these arms, extending transversely thereof, there is a stud-receiving socket 9 that is circular in end elevation. A slot 10 extends from the socket 9 to the rear side 11 of the link. The width 12 of the slot 10 is less than the diameter of the socket 9 and it is inclined to the plane of the rear side 11 of the link in a direction away from the end edge of the end portion 6.

The end portion 5 has an extension or tongue 13 extending from the end thereof. This tongue is of a width to be received between the arms of the bifurcated end portion of a like link such as the arms 14 and 15 of the end portion 16 of the link 1. A pivot stud 17 extends transversely of the tongue 13, from both sides thereof. The pivot stud 17 is, in general, circular in end elevation and of a diameter to be pivotally received in the stud-receiving socket of the arms of the bifurcated end portion of another link, such as the socket 18 of the link 1. At one side 19, the stud is flat, along a cord of the circle, so that in a direction perpendicular to the flat side 19, the transverse dimension thereof is less than the diameter and such that when the flat side is parallel to a side of a slot, such as the slot 20 in the bifurcated end portion of the link 1, the stud may pass into and through the slot. In this way the stud may be entered in the stud-receiving socket of an adjacent link.

It is to be noted that the flat side on the stud is parallel to the front face of the link. Thus, to enter the stud 21 on the link 3 in the stud-receiving socket 9 of the link 2, the link 3 is rotated rearwardly about the axis of the stud until the flat side 22 on the stud 21 is parallel to the wall of the slot 10. The stud is then entered in the slot and drawn up into the stud-receiving socket. The link 3 is than rotated forwardly and is pivotally connected to the link 2.

A series of such links connected together in end to end relation, as above described, forms a flexible belt of pleasing appearance. The links are securely attached together and will not come apart, accidentally, in normal use. At the same time, links are readily removed or added at any portion of the belt so that multiple color or other decorative arrangements may be made or changed to suit the taste or desire of the wearer. Since the links may be molded as units from known thermo-plastic resins, they may be produced economically in large quantites and in various designs and in colors.

From the foregoing description of the embodiment of the invention illustrated in the drawing, it will be apparent to those skilled in the art that by this invention there is provided a link for a flexible belt for wearing apparel and a flexible belt that is comparatively inexpensive to manufacture, decorative in appearance, and readily assembled or changed by the ordinary individual.

It will be obvious that various changes may be made by those skilled in the art in the embodiment of the invention illustrated in the drawing and described above within the principle and scope of the invention as expressed in the appended claims.

We claim:

1. As an article of manufacture, a link adapted to interengage in end to end relation with like links to form a flexible belt for wearing apparel, which link includes a central portion of greater width than the thickness thereof, an end portion at one end of the central portion, a pivot stud extending transversely of said end portion, the pivot stud having a flat side, whereby its transverse dimension perpendicular to the flat side is less than the diameter thereof, and another end portion at the opposite end of the central portion having a transverse stud-receiving socket therein and a slot with parallel side walls extending from the stud-receiving socket, the slot being of a width to receive a stud of another like link when the flat surface of the stud is parallel to one side of the slot and the flat surface of the stud and the slot being arranged such that the rear surfaces of two links must make an acute angle in order to enter or remove the stud.

2. As an article of manufacture, a link adapted to interengage in end to end relation with like links to form a flexible belt for wearing apparel, which link includes a central portion of greater width than the thickness thereof, an end portion at one end of the central portion having a tongue extension of lesser width than the central portion extending therefrom, a pivot stud extending transversely of said tongue extension, the pivot stud having a flat side, whereby its transverse dimension perpendicular to the flat side is less than the diameter thereof, and a bifurcated end portion at the opposite end of the central portion having a transverse stud-receiving socket therein and a slot with parallel side walls extending from the stud-receiving socket, the slot being of a width to receive a stud of another like link when the flat surface of the stud is parallel to one side of the slot and the flat surface of the stud and the slot being arranged such that the rear surfaces of two connecting links must make an acute angle in order to enter into or remove the stud from the slot.

PERCY W. CARR.
STEPHEN G. GERLACH.

REFERENCES CITED

The following references are of record in the file of this patent:

UNITED STATES PATENTS

| Number | Name | Date |
|---|---|---|
| 670,726 | Pierce | Mar. 26, 1901 |
| 767,941 | Hartung | Aug. 16, 1904 |
| 1,152,477 | Bixby | Sept. 7, 1915 |
| 2,009,157 | Zilles et al. | July 23, 1935 |